United States Patent [19]
Dupuy et al.

[11] Patent Number: 5,875,062
[45] Date of Patent: Feb. 23, 1999

[54] TRANSMITTER, RECEIVER AND FRAME FOR TRANSMITTING DATA WITH REDUCED AMBIGUITY

[75] Inventors: Pierre Dupuy, Paris; Laurent Cruchant, Rueil Malmaison, both of France

[73] Assignee: Alcatel Mobile Communication France, Paris, France

[21] Appl. No.: 301,587

[22] Filed: Sep. 7, 1994

[30] Foreign Application Priority Data

Sep. 8, 1993 [FR] France .................................. 93 10679
Jul. 1, 1994 [FR] France .................................. 94 08154

[51] Int. Cl.$^6$ ........................................................ H04L 7/00
[52] U.S. Cl. ........................... 375/368; 375/365; 370/509; 370/512
[58] Field of Search ....................... 375/116, 114, 375/59, 60, 75, 368, 365, 295, 316; 370/84, 82, 105.1, 105.4, 102, 522, 509, 512

[56] References Cited

U.S. PATENT DOCUMENTS

| | | |
|---|---|---|
| 4,617,658 | 10/1986 | Walters . |
| 4,651,319 | 3/1987 | Bowlds . |
| 4,756,007 | 7/1988 | Qureshi et al. .......................... 375/37 |
| 4,760,573 | 7/1988 | Calvignac et al. . |
| 4,764,921 | 8/1988 | Graves et al. . |
| 5,046,074 | 9/1991 | Abiven et al. . |
| 5,113,391 | 5/1992 | Gupta et al. . |

FOREIGN PATENT DOCUMENTS

| | | |
|---|---|---|
| 0222544A2 | 5/1987 | European Pat. Off. . |
| WO8606231 | 10/1986 | WIPO . |

OTHER PUBLICATIONS

"Data Communication Over the Telephone Network", *International Telegraph and Telephone Consultative Committee, Recommendations*, v.110, pp. 1–8.

Stallings, "Data and Computer Communications", 1988, pp. 149–152.

*Primary Examiner*—Melvin Marcelo
*Assistant Examiner*—Congvan Tran
*Attorney, Agent, or Firm*—Sughrue, Mion, Zinn, Macpeak & Seas, PLLC

[57] ABSTRACT

A transmission frame comprises a locking row, synchronization bits and data bits, the synchronization bit being placed immediately after the locking row. The frame terminates with a synchronization bit. A transmitter and a receiver are linked by a transmission channel carrying these frames.

7 Claims, 3 Drawing Sheets

| 0 | 0 | 0 | 0 | 0 | 0 | 0 | 0 |
|---|---|---|---|---|---|---|---|
| 1 | B1 | B2 | B3 | B4 | B5 | B6 | B7 |
| 1 | B8 | B9 | B10 | B11 | B12 | B13 | B14 |
| 1 | B15 | B16 | B17 | B18 | B19 | B20 | B21 |
| 1 | B22 | B23 | B24 | B25 | B26 | B27 | B28 |
| 1 | B29 | B30 | B31 | B32 | B33 | B34 | B35 |
| 1 | B36 | B37 | B38 | B39 | B40 | B41 | B42 |
| 1 | B43 | B44 | B45 | B46 | B47 | B48 | B49 |
| 1 | B50 | B51 | B52 | B53 | B54 | B55 | B56 |
| 1 | B57 | B58 | B59 | B60 | B61 | B62 | 1 |

FIG. 1A

| X | X | X | X | 1 | 0 | 0 | 0 | 0 | 0 | 0 | 0 | 0 | 0 | 0 | 1 | X |
|---|---|---|---|---|---|---|---|---|---|---|---|---|---|---|---|---|
| X | 1 | 0 | 0 | 0 | 0 | 0 | 0 | 0 | 0 | 0 | 0 | 1 | X | X |   | X |

FIG. 1B

| X | 1 | 0 | 0 | 0 | 0 | 0 | 0 | 0 | 0 | 0 | 1 | X | X | X | X |
|---|---|---|---|---|---|---|---|---|---|---|---|---|---|---|---|
| X | X | X | X | 1 | 0 | 0 | 0 | 0 | 0 | 0 | 0 | 0 | 0 | 1 | X |

FIG. 2

| X | X | 1 | 0 | 0 | 0 | 0 | 0 | 0 | 0 | 0 | 1 | X | X |
|---|---|---|---|---|---|---|---|---|---|---|---|---|---|
| X | X | X | 1 | 0 | 0 | 0 | 0 | 0 | 0 | 0 | 1 | X | X |

FIG. 3

| 0 | 0 | 0 | 0 | 0 | 0 | 0 | 0 |
|---|---|---|---|---|---|---|---|
| 1 | B1 | B2 | B3 | B4 | B5 | B6 | B7 |
| 1 | B8 | B9 | B10 | B11 | B12 | B13 | B14 |
| 1 | B15 | B16 | B17 | B18 | B19 | B20 | B21 |
| 1 | B22 | B23 | B24 | B25 | B26 | B27 | B28 |
| 1 | B29 | B30 | B31 | B32 | B33 | B34 | B35 |
| 1 | B36 | B37 | B38 | B39 | B40 | B41 | B42 |
| 1 | B43 | B44 | B45 | B46 | B47 | B48 | B49 |
| 1 | B50 | B51 | B52 | B53 | B54 | B55 | B56 |
| 1 | B57 | B58 | B59 | B60 | B61 | B62 | 1 |

TRANSMITTER, RECEIVER AND FRAME FOR TRANSMITTING DATA WITH REDUCED AMBIGUITY

BACKGROUND OF THE INVENTION

Description of the Prior Art

In a system of synchronous communication between data processing equipments one of the most widely used methods for sending messages consists in defining a frame structure characterized by:

a synchronization flag, special coding of the data to be transmitted so that the synchronization flag cannot be recognized in the middle of the data stream transmitted.

One of the best known ways to implement this method is to choose a flag which is a constant stream of P binary zeros followed by a binary 1. The data is then coded simply by inserting a binary 1 each time that a series of (P−1) binary 0 has been transmitted. For example, if the flag is '00001', the message '0010 0000 10' is transmitted in the form: '00001 0010 00100 10'. The six underlined digits represent the synchronization flag and the inserted binary 1 (the spaces are included only to facilitate reading).

This method has a drawback: the time to transmit a message depends on its contents, which is a serious problem if a fixed routing time is required.

The known solution to this problem is to insert a binary 1 every (P−1) data bits transmitted: it is then certain that P consecutive binary zeros will never be encountered and the transmission time is always the same, regardless of the data transmitted. A well-known example of this method is the use of V.110 frames as defined by the CCITT (Comité Consultatif International du Téléphone et du Télégraphe). These frames comprise a flag made up of eight binary zeros followed by a binary 1, a binary 1 being then inserted every seven bits to form a frame of 80 bits, 17 bits used for synchronization and 63 bits for the data.

A frame can be represented by a table with P columns and L rows. The first row, known as the locking row, includes P binary zeros and subsequent rows, known as data rows, each comprise a synchronization bit of binary 1 followed by (P−1) data bits.

When data is transmitted by means of such frames the transmission channel often has a data signaling rate which is greater than that required to convey the frames produced by an equipment.

To economize on transmission channels it is natural to use multiplexing whereby the channels are divided into subchannels so that the data signaling rate of one subchannel conveys the data from one equipment.

Patent application EP-A-0 222 544 proposes a fixed format frame divided into a plurality of subchannels at the same data signaling rate, a specific subchannel being used for synchronization. This solution is restricted to the transmission of subchannels at a specific data signaling rate. It can be necessary to use the same frame to transmit different data signaling rates. The method described in this document can be simplified to define a frame as the succession of a synchronization channel and two subchannels called half-rate subchannels. Also, it is assumed that the combination of the two half-rate subchannels constitutes a full-rate channel.

Provision can therefore be made to use this frame either to transmit data from one equipment requiring a full-rate channel or to transmit data from two separate equipments each requiring a half-rate subchannel.

However, on receiving a frame of this kind it is impossible to tell which of these two situations applies.

Furthermore, this solution cannot be applied if the two half-rate subchannels are not identically synchronized, as there is only one synchronization subchannel.

U.S. Pat. No. 5,113,391 describes a frame capable of conveying channels at different data signaling rates and means for determining the nature of these channels. Here again, however, the system is a synchronized system and all the channels are referred to the same clock.

Thus a serious problem arises in transmitting channels whose time synchronization is unknown.

One obvious solution to this problem is to use a V.110 type frame for a full-rate channel and to use a similar but shortened frame for each half-rate subchannel, two subchannels being transmitted by multiplexing two shortened frames.

In a conventional solution this multiplexing is carried out in such a way that the bits of the channel correspond to the alternating sequence of bits from each of the two subchannels. Thus the odd-numbered bits of the channel come from a first subchannel and the even-numbered bits from a second subchannel.

One channel can be used in this way to convey two subchannels, but this rules out the interchangeable use of two half-rate subchannels or a full-rate channel, because the simultaneous reception of two subchannels can be interpreted as the reception of a single full-rate channel.

This ambiguity results from the fact that if the two subchannels simultaneously transmit a number of binary 0 at least equal to P/2 (where P is the length of the locking row for a full-rate channel), the stream of bits resulting from multiplexing of the two subchannels includes at least P consecutive binary 0 and can therefore be wrongly interpreted as a locking row of a full-rate channel.

Two situations can arise.

In the first situation the locking row used for the subchannels comprises P' binary 0, P' being such that 2·(P'−1) is greater than or equal to P. Ambiguity arises whenever two rows of data which comprise a series of (P'−1) binary 0 are sent with a time difference less than (P'−INT(P/2+1)+1), INT(x) denoting the integer part of x. After multiplexing of these two rows of data there will be at least P consecutive binary 0.

With P=16 and P'=11, for example, there will be at least 16 consecutive binary 0 in all configurations for which the time difference is less than or equal to the maximal time difference. The two configurations corresponding to this maximum time difference, the initial configuration and the final configuration, are shown in FIGS. 1A and 1B, in which:

the first line represents a first half-rate subchannel, the second line represents a second half-rate subchannel, the pattern inside the bold line frame represents the full-rate locking row resulting from regarding the two half-rate subchannels as a single full-rate channel.

In a second situation, ambiguity can arise in circumstances additional to those described above. If the subchannel locking row comprises P' binary 0 where P' is such that 2·(2·P'−1) is greater than or equal to P, the end of a frame can include (P'−1) consecutive binary 0. The next frame beginning with a locking row will include P' binary 0 and there will be (2·P'−1) consecutive binary 0 which will be wrongly interpreted as the locking row of a full-rate frame if the same phenomenon occurs at the same time on both the half-rate subchannels.

FIG. 2 shows on example of a configuration of this type with P=16 and P'=5. The drawing conventions are the same as for FIG. 1 and the separation of two consecutive frames is shown by a vertical line.

It can therefore be seen that the choice of the number P' of binary 0 in the locking row of frames sent on the half-rate subchannels greatly influences the risk of confusion with a locking row of the frame sent on the full-rate channels. The ambiguity can be avoided by reducing sufficiently the number P'.

However, reducing the length of the locking row is achieved to the detriment of transmission efficiency.

The raw data signaling rate is usually defined as the number of bits of the frame transmitted per unit time and is therefore proportional to P'·L', where L' represents the number of rows of the half-rate frame. The usable data signaling rate is defined as the number of data bits of the frame transmitted during the same unit time and is therefore proportional to (P'−1)·(L'−1). The transmission efficiency is the ratio of the usable data signaling rate to the raw data signaling rate, that is:

(P'−1)·(L'−1)/P'·L'

The closer together the values of P' and L', the greater the efficiency. Thus if a low value is chosen for P', a low value should also be chosen for L'. On the other hand, the longer the frame, i.e. the greater the product of the number of columns by the number of rows (P'·L'), the higher the transmission efficiency. It is therefore not desirable to reduce the length of the locking row too much.

Consideration could be given to coding a specific field of the half-rate frame so that after multiplexing it is impossible to encounter the value of this field in a full-rate channel.

Although in practise it may be a relatively simple matter to solve this problem if there are very few ambiguous configurations (one only, for example), the problem becomes virtually insoluble with a greater number of cases of ambiguity. It can even be more beneficial to reduce the value of P' because of the number of bits to be added to the half-rate frames to resolve the ambiguity.

An object of the present invention is thus to reduce the number of ambiguous configurations of transmission frames regardless of the length of the locking row, or even to eliminate such ambiguous configurations entirely.

SUMMARY OF THE INVENTION

A transmission frame of the invention comprises a locking row, synchronization bits and data bits, a synchronization bit being placed immediately after the locking row, and the frame terminates with a synchronization bit.

The invention also consists in a receiver adapted to receive data frames corresponding either to a full-rate channel or to at least one low-rate subchannel each allocated a specific synchronization pattern, the transmitter comprising means for synchronizing to any one of the received frames.

The invention also consists in a transmitter adapted to transmit frames each comprising a locking row, synchronization bits and data bits, the transmitter comprising means for framing the locking row between two synchronization bits.

Also, if the frames terminate with alignment bits having the same value as the synchronization bits, the transmitter comprises means for eliminating the last alignment bit on command only if the data bit preceding it has the value of a synchronization bit.

The invention will emerge more clearly from the following description of embodiments of the invention given by way of example only and with reference to the appended drawings.

BRIEF DESCRIPTION OF THE DRAWINGS

FIGS. 1A and 1B show two ambiguous configurations encountered in a first situation.

FIG. 2 shows an ambiguous configuration encountered in a second situation.

FIG. 3 shows one example of a frame of the invention.

DETAILED DESCRIPTION OF THE PREFERRED EMBODIMENT

Figure 4:
FIG. 4 shows a transmitter.

The frame of the invention is described with reference to FIG. 3 and is derived from the V.110 frame already mentioned.

The frame used for a subchannel is represented in the form of a table in this figure and comprises a locking row formed of eight binary 0 and nine rows of data each beginning with a synchronization bit at binary 1. The value of the synchronization bits is therefore the complement of the value of locking row bits.

A block of data to transmit is in the form of a series of 62 data bits B1 to B62.

The first data row comprises the first seven data bits B1 to B7. The second data row comprises the next seven data bits B8 to B14, and so on up to the last data row which comprises the last six data bits B57 to B62 and which, unlike a V.110 frame, terminates with a synchronization bit at binary 1 instead of a data bit.

Accordingly, the only row including eight binary 0 (the locking row) will always be preceded by a binary 1 which is the last bit of the preceding frame.

It is therefore certain that on multiplexing two frames of this type there will never be more than 16 consecutive binary 0, whereas with a V.110 frame there could be up to 30 consecutive binary 0.

The invention naturally applies to the general case of a half-rate frame comprising a locking row of length P' and (L'−1) data rows.

Remember that the frame used for a full-rate channel comprises a locking row of length P and (L−1) data rows.

Thus, if P is greater than 2P', there is no longer any ambiguity, and even if this condition is not met the number of ambiguous configurations is significantly reduced.

If P=16, for example, there is no ambiguity if P' is less than 8 and there is only one ambiguous configuration if P'=8.

In the latter case, an identification field can be substituted for data bits in the frame, specifying that this is a subchannel. A simple method of doing this is to replace a synchronization bit with a binary 0 so that the receiver detects a synchronization error on the full rate channel. The receiver must always receive a binary 1 at the start of a data row. If this synchronization bit is forced to binary 0, however, it is necessary to insert binary 1 on either side of this bit at binary 0 to ensure non-repetition of P' consecutive binary 0.

A new frame structure is then defined with reference to that described in connection with FIG. 3 by substituting in the first data row a binary 1 for the last bit B7 and by substituting in the second data row a binary 0 for the synchronization bit and a binary 1 for the next bit B8.

Note that if it is essential for a synchronization bit to follow on immediately from the locking row to prevent the repetition of more than P' consecutive binary 0, the other synchronization bits can be placed anywhere provided that two consecutive synchronization bits are never separated by more than (P'−1) data bits. Remember that this is the only justification for the synchronization bits.

Another solution is therefore to provide, as already explained, a synchronization bit at the last bit position of the last data row and then another synchronization bit P' bits before this one, i.e. at the last bit position of the penultimate data row, and so on so that each data row terminates with a synchronization bit.

It is also necessary to provoke a synchronization error on the full-rate frame. This can be done by forcing to binary 0 the first bit of the second data row.

This produces another frame structure which can be suitable for the half-bit frame and which comprises:

a locking row, a first data row beginning with a binary 1 followed by six data bits and terminating with a binary 1, a second data row beginning with a binary 0 followed by six data bits and terminating with a binary 1, all the other data rows comprising seven data bits and terminating with a binary 1.

To summarize, as the person skilled in the art is well aware, a synchronization bit is required after the locking row, a synchronization bit is also required at the end of the frame, but the other synchronization bits can be placed anywhere provided that they are never separated by more than (P'−1) data bits.

The invention therefore concerns a transmitter which comprises means for assigning the value of a synchronization bit to the last bit of a frame (see FIG. 4). These means will not be described as they are part of the prior art, the transmitter being already adapted to place a synchronization bit of this kind at a different location. Suffice to say that although this operation is necessary for a half-rate frame, it is not needed for a full-rate frame. The nature of the last bit can therefore be chosen at will for the latter frame.

If two half-rate transmitters share the channel they can operate independently of each other because each half-rate subchannel is independently synchronized.

Figure 5:
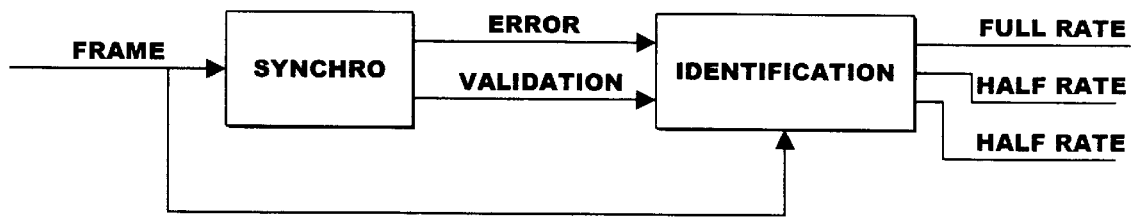
FIG. 5 shows a receiver.

The invention also concerns a receiver adapted to receive half-rate or full-rate frames from a transmitter (see FIG. 5).

In the known manner this receiver comprises synchronization means for synchronizing to a full-rate frame.

These synchronization means look for a sequence of P binary 0 followed by a synchronization bit:

if they do not find any such sequence at the end of a specific time period they produce an error signal, if they do find this sequence, they verify that the bits of rank k·P+1 in the frame are at binary 1 for any value of k between 1 and (L−1) (these are synchronization bits produced by the transmitter); if any one of these bits is at binary 0 they again produce an error signal.

If synchronization is achieved the synchronization means produce a validation signal.

The receiver further comprises identification means which receive the error signal and the validation signal.

If the validation signal is present they specify that the frame received should be treated as a full-rate frame.

If the error signal is present they proceed to demultiplex the frame received onto two channels.

Synchronization is then looked for on each channel, as already explained, to verify if it is a half-rate frame. If this is the case on one channel, the identification means specify that it is a half-rate subchannel and must be treated as such.

The receiver is considerably simplified in that if complete synchronization is achieved on a full-rate frame there is no longer any ambiguity as to the nature of the frame received. It is not necessary to analyze the bits received except for those in the locking row and the synchronization bits.

The person skilled in the art will evidently understand that the implementation of the receiver described above is by way of example only and that there are many other possibilities. It is naturally possible to look for synchronization simultaneously on a full-rate channel and on a half-rate subchannel given that the respective synchronization patterns are different (here synchronization pattern refers to the locking row and the position of the synchronization bits).

It is now necessary to examine specific frames using time alignment bits. A frame of this kind is described in GSM recommendation 08.60, version 3.3.1, pages 7 through 19. This frame is of the V.110 type but terminates with four alignment bits which are substituted for data bits. These alignment bits are used to compensate any synchronization error between the equipment which sends the frame and that which receives it. They are therefore adapted to be transmitted or not on command of a control unit according to the synchronization error.

The alignment bits do not modify in any way the processing of a full-rate channel since the latter bits are not involved in the structure of the frame.

The same does not apply in the case of half-rate frames since the invention requires that the last bit is a synchronization bit. An advantageous solution here is to assign these alignment bits the same value as the synchronization bits.

It is then no longer necessary to add a synchronization bit at the end of the frame. In the presence of n alignment bits it will always be possible to dispense with the transmission of (n−1) of these bits. The last alignment bit is eliminated only if the last data bit of the frame has the value of a synchronization bit.

This could cause a slight time-delay in the alignment of the synchronizations of the transmitter and receiver equipments, but in most cases any such time-delay will be of no consequence. It is not usually necessary to correct the synchronization error instantaneously.

In any event, this correction is required only occasionally, with the result that there is a very low probability of finding a series of consecutive frames in which the last data bit has a value which is the complement of that of a synchronization bit in sufficiently high numbers to prevent alignment of the synchronizations. For example, if the frame timing rate is 50 per second, there is one chance in 30 million of having to wait more than one half-second before the last alignment bit can be eliminated.

The prior art transmitter, being already designed to eliminate an alignment bit in response to an alignment signal, is very simple to modify to implement the invention. The first (n−1) alignment bits are eliminated, as usual, in the presence of the alignment signal. On the other hand, the last alignment bit is eliminated if the alignment signal is present and the last data bit has the value of a synchronization bit.

The invention finds a specific application in the GSM mobile radio system, especially in the case of transmitting speech. In this case the blocks of data to be transmitted are encoded speech packets.

In this system full-rate coded speech (at 13 kbit/s) has to be transcoded before it is subsequently used, for example in the public switched telephone network. There is therefore a transcoder (receiver) receiving coded speech packets from a base transceiver station (transmitter).

The GSM system also provides for half-rate speech coding (at approximately 6.5 kbit/s).

One obvious idea is to multiplex two subchannels each conveying a half-rate coded packet to convey them on a channel provided for a full-rate packet, with the aim of economizing the transmission links between the base transceiver station and the transcoder.

Obviously, the invention applies to other data signaling rates and for different numbers of subchannels.

There is claimed:

1. A method of communicating between stations, comprising sending a transmission frame comprising a locking row, synchronization bits and data bits, a first one of said synchronization bits being placed immediately after said locking row, and said transmission frame terminating with another one of said synchronization bits, wherein said transmission frame includes an identification field specifying that said frame is associated with a subchannel.

2. A receiver, comprising:
   means for receiving frames corresponding to one of a full rate frame of a full-rate channel and a subchannel rate frame of at least one low-rate subchannel, said full-rate channel and said at least one low-rate subchannel each being assigned a specific synchronization pattern;
   means for synchronizing to any received one of said frames;
   said receiving means and said synchronizing means being adapted so as to operate on said frames, wherein said subchannel rate frame has a frame format including:
   a locking row, synchronization bits, and data bits;
   a first one of said synchronization bits being immediately after said locking row;
   another one of said synchronization bits terminating said frame format; and
   an identification field representing said specific synchronization pattern and specifying that said subchannel rate frame is associated with said at least one low-rate respective subchannel.

3. A transmitter for transmitting frames, each of said frames comprising a locking row having an end portion, synchronization bits, data bits, and an end-of-frame position; said transmitter comprising:
   means for setting a first one of said synchronization bits at each said end portion of each said locking row, and for setting another one of said synchronization bits at each said end-of-frame position of each of said frames, and
   means for setting in each of said frames an identification field specifying that each of said frames is associated with a subchannel.

4. A transmitter according to claim 3 wherein:
   each of said frames further comprises a plurality of alignment bits, terminating with a last alignment bit;
   each one of said alignment bits and each one of said synchronization bits having an identical value;
   each of said frames terminates with said plurality of alignment bits so that said last alignment bit corresponds to said another one of said synchronization bits at said end-of-frame position; and
   said transmitter comprises means for eliminating said plurality of alignment bits on command only if a data bit right before said plurality of alignment bits has said identical value.

5. A system for transmitting binary data having an input form and a framed form, comprising:
   a data communication channel;
   transmitter means for converting said binary data from said input form to said framed form, and for transmitting said converted binary data over said data communication channel; and
   receiver means for receiving said converted binary data over said data communication channel, and for converting said binary data from said framed form to said input form;
   said framed form of said binary data having a transmission frame comprising an initial portion, an identification field, and a final portion;
   said initial portion comprising a locking row;
   said locking row being followed immediately by a first synchronization bit;
   said final portion terminating with a final synchronization bit; and
   said identification field being between said initial portion and said final portion, and indicating that said transmission frame is associated with a subchannel of said data communication channel.

6. The system claimed in claim 5, wherein:
   said locking row has a length in bits;
   said transmission frame is divided into a plurality of data rows including a first data row, a second data row, an interim data row, and a final data row;
   each said data row has a length equal to said length of said locking row, and has a first bit position, a second bit position, and a final bit position;
   said first synchronization bit is in said first bit position of said first data row;
   said final synchronization bit is in said final bit position of said final data row;
   said transmission frame further comprises a plurality of additional synchronization bits, each of said additional synchronization bits being in a respective said first bit position of said interim data row and said final data row; and
   said identification field is defined by said final bit position of said first data row, said first bit position of said second data row, and said second bit position of said second data row.

7. The system claimed in claim 5, wherein:
   said locking row has a length in bits;
   said transmission frame is divided into a plurality of data rows including a first data row, a second data row, an interim data row, and a final data row;
   each said data row has a length equal to said length of said locking row, and has a first bit position and a final bit position;
   said first synchronization bit is in said first bit position of said first data row;
   said final synchronization bit is in said final bit position of said final data row;
   said transmission frame further comprises a plurality of additional synchronization bits, each of which is in a respective said final bit position of said first data row and said interim data row; and
   said identification field being defined by said first bit position of said second data row.

* * * * *